(12) United States Patent
Liu

(10) Patent No.: US 11,706,639 B2
(45) Date of Patent: Jul. 18, 2023

(54) COMMUNICATION METHOD, SECONDARY NETWORK NODE AND TERMINAL

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/336,038

(22) Filed: Jun. 1, 2021

(65) Prior Publication Data
US 2021/0289369 A1    Sep. 16, 2021

Related U.S. Application Data

(63) Continuation of application No. 16/494,721, filed as application No. PCT/CN2017/077574 on Mar. 21, 2017, now Pat. No. 11,057,783.

(51) Int. Cl.
*H04W 24/02*   (2009.01)
*H04W 28/02*   (2009.01)

(52) U.S. Cl.
CPC ....... *H04W 24/02* (2013.01); *H04W 28/0236* (2013.01)

(58) Field of Classification Search
None
See application file for complete search history.

(56) References Cited

U.S. PATENT DOCUMENTS 9,936,515 B2 *   4/2018   Fujishiro ............... H04W 36/38
2015/0215944 A1   7/2015   Kim et al.
(Continued)

FOREIGN PATENT DOCUMENTS

CN   104812008 A   7/2015
CN   104936161 A   9/2015
(Continued)

OTHER PUBLICATIONS

Indonesia Office Action with English Translation for ID Application P00201909298 dated Dec. 24, 2021. (10 pages).
(Continued)

*Primary Examiner* — Walter J Divito
(74) *Attorney, Agent, or Firm* — Young Basile Hanlon & MacFarlane, P.C.

(57) ABSTRACT

Disclosed are a communication method, a secondary network node, and a terminal. The method includes a secondary network node acquires a network state of a cell served by the secondary network node; the secondary network node updates a network configuration of the cell served by the secondary network node according to the network state of the cell served by the secondary network node; the secondary network node sends first update configuration information to a terminal, wherein the first update configuration information is used for updating the network configuration of the cell served by the secondary network node. The network configuration of the cell served by the secondary network node is autonomously updated by the secondary network node according to the network state of the cell served by the secondary network node.

14 Claims, 7 Drawing Sheets

(56) References Cited

U.S. PATENT DOCUMENTS

| | | | |
|---|---|---|---|
| 2015/0223220 | A1 | 8/2015 | Zhao et al. |
| 2015/0230221 | A1 | 8/2015 | Kim et al. |
| 2016/0165627 | A1 | 6/2016 | Uemura et al. |
| 2016/0205603 | A1 | 7/2016 | Uchino et al. |
| 2016/0337911 | A1* | 11/2016 | Engström ............... H04L 5/001 |
| 2017/0222782 | A1 | 8/2017 | Wen et al. |
| 2020/0045690 | A1 | 2/2020 | Martin et al. |

FOREIGN PATENT DOCUMENTS

| | | |
|---|---|---|
| CN | 104936175 A | 9/2015 |
| CN | 105101388 A | 11/2015 |
| CN | 105451278 A | 3/2016 |
| CN | 106416421 A | 2/2017 |
| EP | 3079435 A1 | 10/2016 |
| RU | 2534737 C2 | 12/2014 |
| WO | 2015030483 A1 | 3/2015 |
| WO | 201620752 A2 | 2/2016 |

OTHER PUBLICATIONS

Israel Office Action with English Translation for IL Application 269417 dated Dec. 26, 2021. (4 pages).
Korean Office Action with English Translation for KR Application 1020197027257 dated Nov. 25, 2021. (11 pages).
3GPP TSG-RAN WG2 #97 Tdoc R2-1700917; Athens, Greece, Feb. 13-17, 2017.
3GPP TSG-RAN WG2 NR Adhoc; Spokane, USA, Jan. 17-19, 2017; R2-1700056.
Extended Search Report for EP Application No. 17901951.8 filed Feb. 17, 2020.
European Examination Report for European Application No. 17901951.8 dated Aug. 6, 2020.
English Translation of Russian First Office Action for Russian Application No. 2019132665 dated Jun. 3, 2020.
English Translation of Russian Notice of Allowance for Russian Application No. 2019132665/07 dated Aug. 14, 2020.
3GPP TSG RAN WG3 Meeting #93bis; R3-162215; Sophia Antipolis, France, Oct. 10-14, 2016; Consideration on CP procedures for LTE and NR interworking; pp. 1-5.
3GPP TSG-RAN WG2 Meeting #97; R2-1701718; Athens, Greece, Feb. 13-17, 2017; Discussion on NR SgNB RRC message transfer directly to the UE; pp. 1-4.
3GPP TSG-RAN WG2 Meeting #96; R2-168186; Reno, Nevada, Nov. 14-18, 2016; Management of secondary node for LTE-NR tight interworking; pp. 1-3.
3GPP TSG-RAN WG2 Meeting #96; R2-168118; Reno, USA, Nov. 14-18, 2016; Measurement coordination in LTE/NR tight interworking; pp. 1-6.
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification; (Release 13); 650 Route des Lucioles—Sophia Antipolis; Valbonne—France.
3GPP TS 36.423 V13.2.0 (De. 2015); 3rd Generation Partnership Project; Technical Specification Group Radio Access Network; Evolved Universal Terrestrial Radio Access Network (E-UTRAN); X2 application protocol (X2AP); (Release 13); 650 Route des Lucioles—Sophia Antipolis; Valbonne—France.
India Office Action for IN Application 201917038048 dated Dec. 7, 2020.
Singapore First Written Opinion for SG Application 11201908642P dated Nov. 17, 2020.
Chili First Office Action with English Translation for CL Application 2019-002666 dated Sep. 17, 2019.
China Office Action with English Translation for CN Application 201911330797.0 dated Nov. 2, 2020.
Canada First Office Action for CA Application 3,057,044 dated Nov. 10, 2020.
Korean Office Action with English translation for KR Application 10-2019-7027257 dated Mar. 22, 2021. (13 pages).
Japanese Office Action with English translation for JP Application 2019-551422 dated Mar. 5, 2021. (6 pages).
European Examination Report for EP Application 17901951.8 dated Mar. 1, 2021. (6 pages).
Chile Second Office Action with English translation for CL Application 201902666 dated Jan. 18, 2021. (20 pages).
RRC aspects for the direct signalling path from secondary node to the UE, 3GPP TSG-RAN WG2 NR Adhoc, R2-1700055, Nokia, Alcatel-Lucent Shanghai Bell, Jan. 19, 2017, 6 pages.
Canadian Examination Report for CA Application 3057044 dated Aug. 26, 2021. (5 pages).
Communication pursuant to Article 94(3) EPC for EP Application 17901951.8 dated Sep. 20, 2021. (7 pages).
Japanese Decision of Refusal with English Translation for JP Application 2019551422 dated Aug. 31, 2021. (7 pages).
Korean Notice of Final Rejection with English Translation for KR Application 1020197027257 dated Sep. 26, 2021. (10 pages).
Taiwan Office Action with English Translation for TW Application 107105078 dated Sep. 17, 2021 . (23 pages).
Korean Office Action with English Translation for KR Application 1020217042294 dated Mar. 29, 2022. (18 pages).
Communication pursuant to Article 94(3) EPC for EP Application 17901951.8 dated Mar. 30, 2022. (7 pages).
Canadian Third Examination Report for CA Application 3057044 dated Jul. 15, 2022. (5 pages).
Communication pursuant to Article 94(3) EPC for EP Application 17901951.8 dated Oct. 6, 2022. (9 pages).
Korean Office Action with English Translation for KR Application 1020217042294 dated Sep. 7, 2022. (10 pages).
Communication pursuant to Article 94(3) EPC for EP Application 17901951.8 dated Mar. 13, 2023. (4 pages).
Israel Second Office Action with English Translation for IL Application 269417 dated Jan. 9, 2023. (5 pages).

* cited by examiner

COMMUNICATION METHOD, SECONDARY NETWORK NODE AND TERMINAL

CROSS-REFERENCE TO RELATED APPLICATION(S)

This application is a continuation application of a U.S. patent application Ser. No. 16/494,721 filed on Sep. 16, 2019, which is a 371 of International PCT Application No. PCT/CN 2017/077574 filed on Mar. 21, 2017. The entire contents of the above-identified applications are incorporated herein by reference.

TECHNICAL FIELD

The present disclosure relates to the field of communication, and more particularly, to a communication method and apparatus.

BACKGROUND

In heterogeneous wireless systems, when different types of base stations cooperate in networking, since bandwidth resources and coverage of a single base station are limited, it is easier to meet requirements of a user for capacity and coverage by concentrating wireless resources of multiple cells or base stations to provide services for the user. This communication method is commonly referred to as multi-connection communication.

As an implementation of the multi-connection communication, a dual-connection communication means that in a future 5G network construction, New Radio (NR) may be used as macro coverage for networking independently, and NR microcell may further be used for hotspot coverage. No matter which networking method is adopted, a terminal may improve a utilization rate of wireless resources, reduce system switching delay and improve performance of a user and a system through a dual connection technology between a LTE system and a 5G system. In short, the dual connection technology means that, in a scenario of Non-standalone NR, a terminal receives or transmits data simultaneously through a Long Term Evolution (LTE) cell and an NR cell.

SUMMARY

The present disclosure provides a communication method and apparatus.

In a first aspect, there is provided a communication method, including: a secondary network node acquires a network state of a cell served by the secondary network node; the secondary network node updates a network configuration of the cell served by the secondary network node according to the network state of the cell served by the secondary network node; the secondary network node sends first update configuration information to a terminal, wherein the first update configuration information is used for updating the network configuration of the cell served by the secondary network node.

In combination with the first aspect, in one possible implementation of the first aspect, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

In combination with the first aspect, in one possible implementation of the first aspect, the secondary network node updates the network configuration of the cell served by the secondary network node according to the network state of the cell served by the secondary network node, including: the secondary network node updates the cell served by the secondary network node according to the network state of the cell served by the secondary network node; the secondary network node sends the first update configuration information to the terminal, wherein the first update configuration information is used for updating the network configuration of the cell served by the secondary network node, including: the secondary network node sends the first update configuration information to the terminal, wherein the first update configuration information is used for updating the cell served by the secondary network node.

In combination with the first aspect, in one possible implementation of the first aspect, the secondary network node acquires the network state of the cell served by the secondary network node, including: the secondary network node receives a measurement report of the cell served by the secondary network node sent by the terminal, wherein the measurement report is used for indicating the network state of the cell served by the secondary network node.

In combination with the first aspect, in one possible implementation of the first aspect, the network state of the cell served by the secondary network node includes a link state of a link for communication between the cell served by the secondary network node and the terminal, and the secondary network node updates the network configuration of the cell served by the secondary network node according to the network state of the cell served by the secondary network node, including: the secondary network node updates the link for communication between the cell served by the secondary network node and the terminal according to the link state; the secondary network node sends the first update configuration information to the terminal, wherein the first update configuration information is used for updating the network configuration of the cell served by the secondary network node, including: the secondary network node sends the first update configuration information to the terminal, wherein the first update configuration information is used for updating the link.

In combination with the first aspect, in one possible implementation of the first aspect, the link state includes signal quality of a signal transmitted between the cell served by the secondary network node and the terminal, and the secondary network node updates the link for communication between the cell served by the secondary network node and the terminal according to the link state, including: the secondary network node updates a link for transmitting the signal according to the signal quality of the signal transmitted between the cell served by the secondary network node and the terminal.

In combination with the first aspect, in one possible implementation of the first aspect, the network state of the cell served by the secondary network node includes a connection state of a connection between the secondary network node and the terminal, and the secondary network node updates the network configuration of the cell served by the secondary network node according to the network state of the cell served by the secondary network node, including:

the secondary network node updates the network configuration of the cell served by the secondary network node according to the connection state of the connection between the secondary network node and the terminal.

In combination with the first aspect, in one possible implementation of the first aspect, the connection state of the connection between the secondary network node and the terminal is used for indicating that the connection is invalid, and the secondary network node updates the network configuration of the cell served by the secondary network node according to the connection state of the connection between the secondary network node and the terminal, including: the secondary network node releases the connection between the secondary network node and the terminal according to the connection state of the connection between the secondary network node and the terminal. The secondary network node sends the first update configuration information to the terminal, wherein the first update configuration information is used for updating the network configuration of the cell served by the secondary network node, including: the secondary network node sends the first update configuration information to the terminal, wherein the first update configuration information is used for releasing the connection between the secondary network node and the terminal.

In combination with the first aspect, in one possible implementation of the first aspect, the secondary network node acquires the network state of the cell served by the secondary network node, including: the secondary network node receives the connection state of the connection between the cells served by the secondary network node and the terminal, sent by the terminal.

In combination with the first aspect, in one possible implementation of the first aspect, the method further includes: the secondary network node sends data to be transmitted to the primary network node, the data to be transmitted being data that the terminal prepares to transmit through the secondary network node.

In combination with the first aspect, in one possible implementation of the first aspect, the method further includes: the secondary network node sends a reestablishment message to the terminal, the reestablishment message being used for reestablishing the connection between the secondary network node and the terminal.

In combination with the first aspect, in one possible implementation of the first aspect, the method further includes: the secondary network node sends indication information to a primary network node, the indication information being used for indicating that the connection between the secondary network node and the terminal is reestablished between the secondary network node and the terminal.

In combination with the first aspect, in one possible implementation of the first aspect, the indication information carries a reason for reestablishing the connection between the secondary network node and the terminal.

In combination with the first aspect, in one possible implementation of the first aspect, the network state of the cell served by the secondary network node includes a state of a bearer in the cell served by the secondary network node, and the secondary network node acquires the network state of the cell served by the secondary network node, including: the secondary network node acquires the state of the bearer in the cell served by the secondary network node. The secondary network node updates the network configuration of the cell served by the secondary network node according to the network state of the cell served by the secondary network node, including: the secondary network node updates the bearer in the cell served by the secondary network node according to the state of the bearer. The secondary network node sends the first update configuration information to the terminal, wherein the first update configuration information is used for updating the configuration of the cell served by the secondary network node, including: the secondary network node sends the first update configuration information to the terminal, wherein the first update configuration information is used for updating the bearer in the cell served by the secondary network node.

In combination with the first aspect, in one possible implementation of the first aspect, a primary cell served by the secondary network node is a first cell, and the secondary network node acquires the network state of the cell served by the secondary network node, including: the secondary network node acquires the network state of the first cell; the secondary network node updates the network configuration of the cell served by the secondary network node according to the network state of the cell served by the secondary network node, including: the secondary network node switches the primary cell from the first cell to a second cell according to the network state of the first cell, wherein the second cell is a cell other than the first cell among cells served by the secondary network node; the secondary network node sends the first update configuration information to the terminal, wherein the first update configuration information is used for updating the configuration of the cell served by the secondary network node, including: the secondary network node sends the first update configuration information to the terminal, wherein the first update configuration information is used for switching the primary cell from the first cell to the second cell.

In combination with the first aspect, in one possible implementation of the first aspect, the method further includes: the secondary network node sends second update configuration information to a primary network node, wherein the second update configuration information is used for indicating updated network configuration of the secondary network node.

In a second aspect, there is provided a communication method, including: a terminal receives first update configuration information sent by a secondary network node, wherein the first update configuration information is used for updating a network configuration of a cell served by the secondary network node, wherein the network configuration of the cell served by the secondary network node is updated by the secondary network node according to a network state of the cell served by the secondary network node; the terminal communicates with the secondary network node according to the first update configuration information.

In combination with the second aspect, in one possible implementation of the second aspect, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

In combination with the second aspect, in one possible implementation of the second aspect, the terminal receives the first update configuration information sent by the secondary network node, including: the terminal receives the first update configuration information sent by the secondary network node, wherein the first update configuration information is used for updating the cell served by the secondary network node; the terminal communicates with the secondary network node according to the first update configuration information, including: the terminal determines an updated cell served by the secondary network node according to the first update configuration information; the terminal communicates with the secondary network node through the updated cell served by the secondary network node.

In combination with the second aspect, in one possible implementation of the second aspect, the method further includes: the terminal sends a measurement report of the cell served by the secondary network node to the secondary network node, and the measurement report is used for indicating the network state of the cell served by the secondary network node.

In combination with the second aspect, in one possible implementation of the second aspect, the network state of the cell served by the secondary network node includes a link state of a link for communication between the cell served by the secondary network node and the terminal, and the terminal receives the first update configuration information sent by the secondary network node, including: the terminal receives the first update configuration information sent by the secondary network node, wherein the first update configuration information is used for updating the link; the terminal communicates with the secondary network node according to the first update configuration information, including: the terminal determines an updated link according to the first update configuration information; and the terminal communicates with the secondary network node through the updated link.

In combination with the second aspect, in one possible implementation of the second aspect, the link state includes signal quality of a signal transmitted between the cell served by the secondary network node and the terminal.

In combination with the second aspect, in one possible implementation of the second aspect, the network state of the cell served by the secondary network node includes a connection state of a connection between the secondary network node and the terminal, wherein the connection state is used for indicating that the connection is invalid, and the terminal receives the first update configuration information sent by the secondary network node, including: the terminal receives the first update configuration information sent by the secondary network node, wherein the first update configuration information is used for releasing the connection between the secondary network node and the terminal.

In combination with the second aspect, in one possible implementation of the second aspect, the method further includes: the terminal sends the connection state of the connection between the cell served by the secondary network node and the terminal to the secondary network node.

In combination with the second aspect, in one possible implementation of the second aspect, the method further includes: the terminal receives a reestablishment message sent by the secondary network node, wherein the reestablishment message is used for reestablishing the connection between the secondary network node and the terminal.

In combination with the second aspect, in one possible implementation of the second aspect, the network state of the cell served by the secondary network node includes a state of a bearer in the cell served by the secondary network node, and the terminal receives the first update configuration information sent by the secondary network node, including: the terminal receives the first update configuration information sent by the secondary network node, wherein the first update configuration information is used for updating the bearer in the cell served by the secondary network node; the terminal communicates with the secondary network node according to the first update configuration information, including: the terminal determines an updated bearer according to the first update configuration information; the terminal communicates with the secondary network node through the updated bearer.

In combination with the second aspect, in one possible implementation of the second aspect, a primary cell served by the secondary network node is a first cell, and the terminal receives the first update configuration information sent by the secondary network node, including: the terminal receives the first update configuration information sent by the secondary network node, wherein the first update configuration information is used for switching the primary cell from the first cell to a second cell, wherein the second cell is a cell other than the first cell among cells served by the secondary network node; and the terminal communicates with the secondary network node according to the first update configuration information, including: the terminal communicates with the secondary network node through the second cell indicated by the first update configuration information.

In combination with the second aspect, in one possible implementation of the second aspect, the method further includes: the terminal sends second update configuration information to a primary network node, wherein the second update configuration information is used for indicating updated network configuration of the secondary network node.

In a third aspect, there is provided a secondary network node, and the secondary network node comprises units for performing the method in the first aspect.

In a fourth aspect, there is provided a terminal, and the terminal comprises units for performing the method in the second aspect.

In a fifth aspect, there is provided a secondary network node including a memory, a processor, an input/output interface, and a communication interface. There is a communication connection between the memory, the processor, the input/output interface, and the communication interface, the memory is used for storing instructions, and the processor is used for executing the instructions stored in the memory. When the instructions are executed, the processor executes the method of the first aspect through the communication interface, and controls the input/output interface to receive input data and information and output data such as operation results.

In a sixth aspect, there is provided a terminal including a memory, a processor, an input/output interface, and a communication interface. There is a communication connection between the memory, the processor, the input/output interface and the communication interface, the memory is used for storing instructions, and the processor is used for executing the instructions stored in the memory. When the instructions are executed, the processor executes the method of the second aspect through the communication interface, controls the input/output interface to receive input data and information, and outputs data such as operation results.

In a seventh aspect, a computer readable medium is provided, which stores program codes to be executed by a network node, wherein the program codes include instructions for executing the method of the first aspect.

In an eighth aspect, a computer readable medium is provided, which stores program codes to be executed by a terminal, wherein the program codes include instructions for executing the method of the second aspect.

In a ninth aspect, there is provided a computer program product including instructions that, when executed on a computer, cause the computer to perform the methods described in the various aspects.

DETAILED DESCRIPTION

In a current dual-connection scenario, only a primary network node (e.g., a master base station MeNB) may perform signaling interaction with a core network through S1-MME connection. Therefore, the primary network node needs to perform signaling interaction with a terminal, needs to perform signaling interaction with the core network for the terminal, and simultaneously also needs to receive or transmit data for the terminal in the dual-connection scenario. To sum up, in the dual-connection scenario, load on the primary network node is large, which is easy to cause network congestion.

Hereinafter, technical solutions in the present disclosure will be described with reference to the accompanying drawings.

Figure 1:
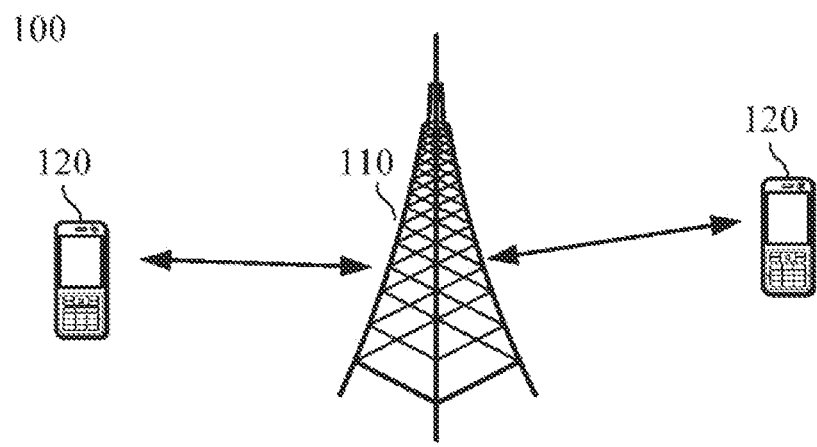
FIG. 1 is a wireless communication system 100 to which an implementation of the present disclosure is applied.

FIG. 1 is a wireless communication system 100 to which an implementation of the present disclosure is applied. The wireless communication system 100 may include a network node 110. The network node 110 may be a device that communicates with a terminal device. The network node 110 may provide communication coverage for a specific geographical area and may communicate with terminal devices located within the coverage area.

FIG. 1 exemplifies one network node and two terminals. Optionally, the wireless communication system 100 may include multiple network nodes and other quantities of terminals may be included within a coverage area of each network node. The implementations of the present disclosure are not limited thereto.

Optionally, the wireless communication system 100 may include other network entities such as a network controller, and a mobility management entity. The implementations of the present disclosure are not limited thereto.

It should be understood that the technical solutions of the present disclosure may be applied to various communication systems, such as a Global System of Mobile Communication (GSM), a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, a New Radio Access Technology (NR), and 5G.

It should further be understood that in the implementations of the present disclosure, a terminal device may include, but not limited to, a mobile station (MS), a mobile terminal, a mobile telephone, a User Equipment (UE), a handset, and a portable equipment, etc. The terminal device may communicate with one or more core networks via a radio access network (RAN). For example, the terminal device may be a mobile phone (or referred to as "cellular" phone) or a computer with wireless communication function. The terminal device may be a mobile apparatus that is portable, pocket-sized, hand-held, built in a computer, or mounted on a vehicle.

In implementations of the present disclosure, the network node may be an access network device, such as a base station, a Transmit and Receive Point (TRP), or an access point. The base station may be a Base Transceiver Station (BTS) in GSM or CDMA, a NodeB in WCDMA, an evolved Node B (eNB or e-NodeB) in LTE, or a NR or 5G base station (gNB). The implementations of the present disclosure are not limited thereto.

Figure 2:
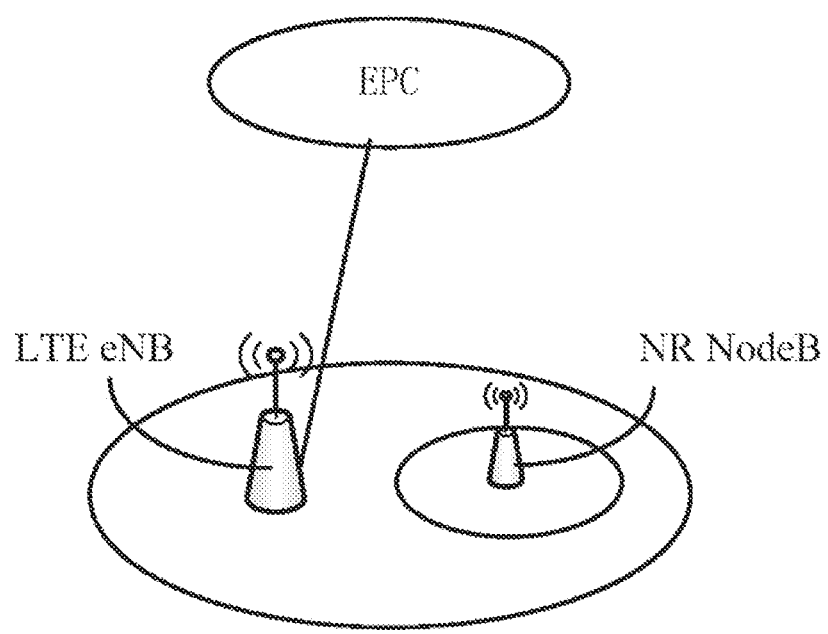
FIG. 2 is a schematic block diagram of an architecture of a scenario of dual-connection communication according to an implementation of the present disclosure.

FIG. 2 is a schematic block diagram of an architecture of a scenario of dual-connection communication according to an implementation of the present disclosure. In the architecture of the scenario of dual-connection communication shown in FIG. 2, a LTE eNB, acting as a primary base station (or primary network node), performs signaling interaction with a core network device EPC through a S1-MME interface, and a NR NodeB, acting as a secondary base station, performs signaling interaction with the primary base station through a X2 interface. The terminal in the dual-connection communication system may establish a primary connection with the primary network node and at least one secondary connection with the secondary base station. The terminal may communicate with the primary base station and the secondary base station in following two manners:

1. Data (e.g., signaling) of a control plane of the terminal is mainly transmitted to the primary base station through the primary connection. For data of a user plane, the terminal may split the data and transmit the data simultaneously through the primary connection and a secondary connection. The secondary base station may reduce load of the primary base station for helping the terminal to transmit the data of the user plane and improve throughput of a network for transmitting the data of the user plane.

2. Data (e.g., signaling) of a control plane of the terminal is mainly transmitted to the primary base station through the primary connection, while data of the user plane may be transmitted by the terminal to the secondary base station through the secondary connection. Compared with the first transmission manner, the secondary base station further reduces the load of the primary base station for transmitting the data of the user plane.

It should be noted that the architecture of the scenario of dual-connection communication shown in FIG. 2 is only illustrated by taking a communication architecture in which the primary network node is a LTE eNB, the secondary network node is a NR NodeB, and the core network device is an Evolved Packet Core (EPC) as an example. The implementation of the present disclosure does not specifically limit specific forms of the primary network node, the secondary network node, and a core network node. For example, in the dual-connection communication scenario, the primary network node may be a NR NodeB, the secondary network node is a LTE eNB, and the core network node is a Next Gen Core; or the primary network node may be a LTE eNB, the secondary network node is a NR NodeB, and the core network node is a Next Gen Core.

However, in an existing dual-connection communication system, network configuration of a secondary network node (e.g., update of a cell served by the secondary network node, update of a bearer between the secondary network node and a terminal) needs to be updated by a primary network node, which will be described in detail below with reference to the method shown in FIG. 3.

Figure 3:
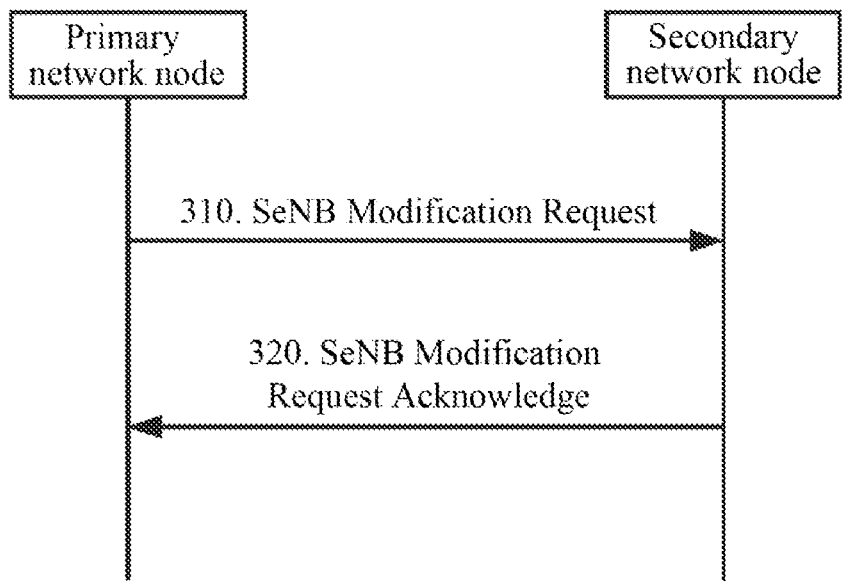
FIG. 3 is a schematic flow chart of a method for changing a configuration of a secondary network node in a dual-connection communication system in the prior art.

FIG. 3 is a schematic flow chart of a method for changing a configuration of a secondary network node in a dual-connection communication system in the prior art. The method shown in FIG. 3 includes acts 310 and 320.

In 310, the primary network node sends a secondary base station modification request (SeNB Modification Request) to the secondary network node, and the SeNB Modification Request is used for instructing the secondary base station to change a network configuration of the secondary base station.

In 320, the primary network node receives a secondary base station modification request acknowledgement (SeNB Modification Request Acknowledge) sent by the secondary network node, and the secondary base station modification request acknowledgement acknowledges that the secondary base station has changed the network configuration of the secondary base station.

As may be seen from the method for changing the configuration of the secondary network node in the dual-connection communication system shown in FIG. 3, if the configuration of the secondary network node is to be changed, the primary network node needs to determine how to change the configuration of the secondary network node. For example, if a quantity of cells served by the secondary network node is to be increased or decreased, the primary network node must determine which cell served by the secondary network node is to be increased or decreased. The method for changing the configuration of the secondary network node will increase the interaction of interactive signaling between the primary network node and the secondary network node and increase the overhead of signaling transmission.

In order to solve the problem, a communication method of the implementation of the present disclosure will be described in detail below with reference to FIG. 4.

Figure 4:
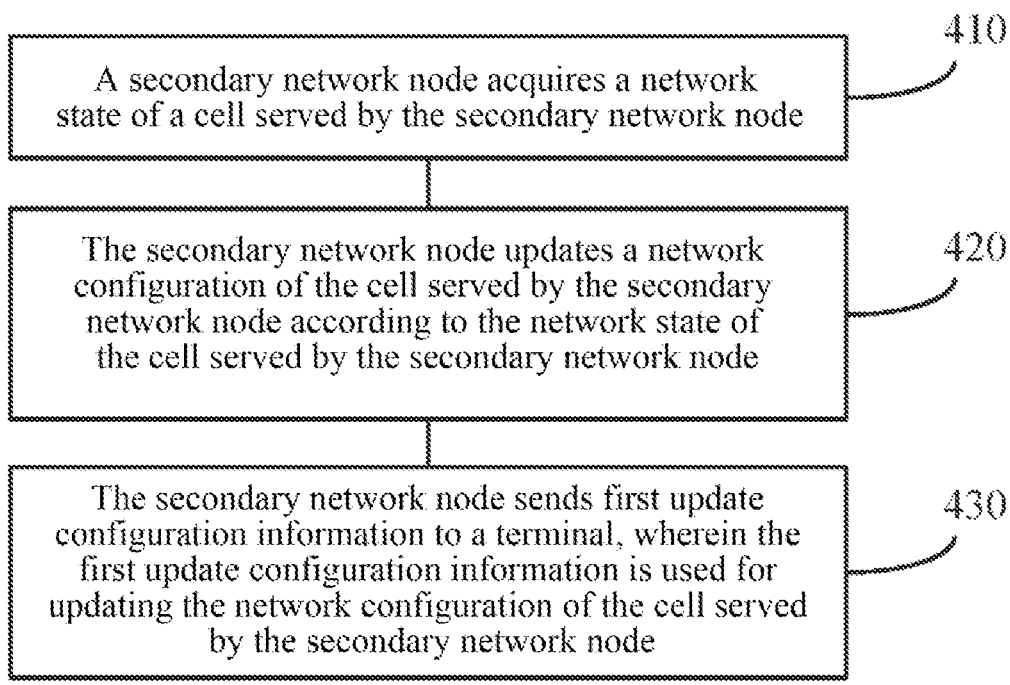
FIG. 4 is a schematic flow chart of a communication method according to another implementation of the present disclosure.

FIG. 4 is a schematic flow chart of the communication method of the implementation of the present disclosure. The method shown in FIG. 4 includes acts 410-430.

In 410, a secondary network node acquires a network state of a cell served by the secondary network node.

It should be noted that the act 410 may include: the secondary network node acquires the network state of the cell served by the secondary network node from a terminal or another network, or the act 410 may include: the secondary network node acquires the network state of the cell served by the secondary network node through its measurement.

Optionally, the network state of the cell served by the secondary network node includes at least one piece of the following information: a congestion state of the cell served by the secondary network node; the amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; and a link state of a link for communication between the secondary network node and the terminal.

Specifically, the signal quality may include a receiving power of the signal transmitted between the secondary network node and the terminal, and the signal quality of the signal may be indicated by the receiving power of the signal. For example, the receiving power of the signal may be a Reference Signal Receiving Power (RSRP); and the signal quality may be a reference signal receiving quality (RSRQ).

The link state may include link quality, a congestion state of a link, and indication information for indicating whether the link is invalid, etc.

The state of the bearer used for transmitting the data to be transmitted by the terminal may include a congestion state of the bearer, a parameter of Quality of Service (Qos) supported by the bearer, etc.

It should be noted that the signal quality is similar to a content carried in a measurement report for measuring a cell by a terminal in an existing communication system. Different from the measurement report, the signal quality may be measured by the terminal, or measured autonomously by the secondary network node. The implementation of the present disclosure is not limited to a specific manner in which the secondary network node acquires the signal quality.

In 420, the secondary network node updates the network configuration of the cell served by the secondary network node according to the network state of the cell served by the secondary network node.

Specifically, the secondary network node updates the network configuration of the cell served by the secondary network node according to the network state of the cell served by the secondary network node, which may refer to that the secondary network node changes the network configuration of the cell served by the secondary network node according to the network state of the cell served by the secondary network node.

It should be noted that the updating the network configuration of the cell served by the secondary network node may refer to updating the cell served by the secondary network node, updating a bearer in the cell served by the secondary network node, updating a link for communication between the cell served by the secondary network node and a terminal, etc. The implementation of the present disclosure does not limit a specific manner of changing the network configuration.

In 430, the secondary network node sends first update configuration information to the terminal, wherein the first update configuration information is used for updating the network configuration of the cell served by the secondary network node.

Optionally, as one implementation, the act 420 includes: the secondary network node updates the cell served by the secondary network node according to the network state of the cell served by the secondary network node; the act 430 includes: the secondary network node sends the first update configuration information to the terminal, wherein the first update configuration information is used for updating the cell served by the secondary network node.

Specifically, the updating the cell served by the secondary network node may include adding or deleting a cell served by the secondary network node.

It should be noted that the first update configuration information may carry a cell ID of the added or deleted cell served by the secondary network node, or the first update configuration information may carry cell IDs of all updated cells served by the secondary network node.

Optionally, the secondary network node acquires the network state of the cell served by the secondary network node, including: the secondary network node receives a measurement report of the cell served by the secondary network node sent by the terminal, wherein the measurement report is used for indicating the network state of the cell served by the secondary network node.

Optionally, as one implementation, the network state of the cell served by the secondary network node includes a link state of a link for communication between the cell served by the secondary network node and the terminal. The act 420 includes: the secondary network node updates the link for communication between the cell served by the secondary network node and the terminal according to the link state. The act 430 includes: the secondary network node sends the first update configuration information to the terminal, wherein the first update configuration information is used for updating the link.

Specifically, the updating the link for communication between the cell served by the secondary network node and the terminal may include adding or deleting a link for communication between the cell served by the secondary network node and the terminal.

Optionally, as one implementation, the link state includes signal quality of a signal transmitted between the cell served by the secondary network node and the terminal, and the secondary network node updates the link for communication between the cell served by the secondary network node and the terminal according to the link state, including: the secondary network node updates a link for transmitting the signal according to the signal quality of the signal transmitted between the cell served by the secondary network node and the terminal.

Optionally, as one implementation, the secondary network node updates the network configuration of the cell served by the secondary network node according to the network state of the cell served by the secondary network node, including: the secondary network node updates the network configuration of the cell served by the secondary network node according to a connection state of a connection between the secondary network node and the terminal.

Specifically, the connection between the secondary network node and the terminal may refer to a connection used by the terminal to access the secondary network node, for example, it may be an RRC connection between the secondary network node and the terminal.

Optionally, as one implementation, the secondary network node indicates that the connection is invalid according to the connection state of the connection between the secondary network node and the terminal, and the secondary network node updates the network configuration of the cell served by the secondary network node according to the connection state of the connection between the secondary network node and the terminal, including: the secondary network node releases the connection between the secondary network node and the terminal according to the connection state of the connection between the secondary network node and the terminal; the secondary network node sends the first update configuration information to the terminal, wherein the first update configuration information is used for updating the network configuration of the cell served by the secondary network node, including: the secondary network node sends the first update configuration information to the terminal, wherein the first update configuration information is used for releasing the connection between the secondary network node and the terminal.

Specifically, the releasing the connection between the secondary network node and the terminal means that the secondary network node no longer serves for the terminal.

Optionally, as one implementation, the network state of the cell served by the secondary network node includes a connection state of a connection between the secondary network node and the terminal. The act 410 includes: the secondary network node acquires the network state of the cell served by the secondary network node, including: the secondary network node receives the connection state of the connection between the cell served by the secondary network node and the terminal sent by the terminal.

Optionally, as one implementation, the method further includes: the secondary network node sends data to be transmitted to the primary network node, wherein the data to be transmitted is data that the terminal prepares to transmit through the secondary network node.

Specifically, the secondary network node may send the data to be transmitted that the terminal prepares to transmit through the secondary network node, to the primary network node, and data transmission is performed through the primary network node.

It should be noted that the transmission of the data to be transmitted of the terminal from the secondary network node to the primary network node may be triggered according to following reasons: the connection between the secondary network node and the terminal is invalid; the secondary network node is currently in a congestion state; a link state of a link between the secondary network node and the terminal is a congestion state. The implementation of the present disclosure does not specifically limit a reason for the triggering.

Optionally, as one implementation, the method further includes: the secondary network node determines to reestablish a connection between the secondary network node and the terminal; the secondary network node sends a reestablishment message to the terminal, wherein the reestablishment message is used for reestablishing the connection between the secondary network node and the terminal.

It should be understood that the reestablishment message may refer to an RRC connection reestablishment message between the secondary network node and the terminal.

Optionally, as one implementation, the method further includes: the secondary network node sends indication information to the primary network node, wherein the indication information is used for indicating that a connection between the secondary network node and the terminal is reestablished between the secondary network node and the terminal.

Specifically, the secondary network node may notify the primary network node through indication information that a connection between the secondary network node and the terminal has been reestablished, so that the primary network node may reasonably allocate transmission resources of the primary network node and transmission resources of the secondary network node for the terminal.

Optionally, as one implementation, the indication information carries a reason for reestablishing the connection between the secondary network node and the terminal.

Optionally, as one implementation, the network state of the cell served by the secondary network node includes a state of a bearer in the cell served by the secondary network node, and the act 410 includes: the secondary network node acquires the state of the bearer in the cell served by the secondary network node; the act 420 includes: the secondary network node updates the bearer in the cell served by the secondary network node according to the state of the bearer; and the act 430 includes: the secondary network node sends the first update configuration information to the terminal, wherein the first update configuration information is used for updating the bearer in the cell served by the secondary network node.

Specifically, updating the bearer in the cell served by the secondary network node includes adding and/or deleting a bearer in the cell served by the secondary network node.

Optionally, as one implementation, a primary cell served by the secondary network node is a first cell, and the act 410 includes: the secondary network node acquires a network state of the first cell; the act 420 includes: the secondary network node switches the primary cell from the first cell to a second cell according to the network state of the first cell, wherein the second cell is a cell other than the first cell among cells served by the secondary network node; and the act 430 includes: the secondary network node sends the first update configuration information to the terminal, wherein the first update configuration information is used for switching the primary cell from the first cell to the second cell.

Specifically, the primary cell may refer to a cell that may monitor and manage other cells, in the cells served by the secondary network node.

Optionally, as one implementation, the method further includes: the secondary network node sends second update configuration information to the primary network node, wherein the second update configuration information is used for indicating updated network configuration of the secondary network node.

Specifically, the secondary network node may send the second update configuration information to the primary network node so that the primary network node may more reasonably allocate transmission resources for the terminal.

It should be noted that a content of the second update configuration information may be the same as that of the first update configuration information, or the content of the second update configuration information may be different from that of the first update configuration information.

The communication method of the implementation of the present disclosure will be described below with reference to specific implementations of three different scenarios.

Figure 5:
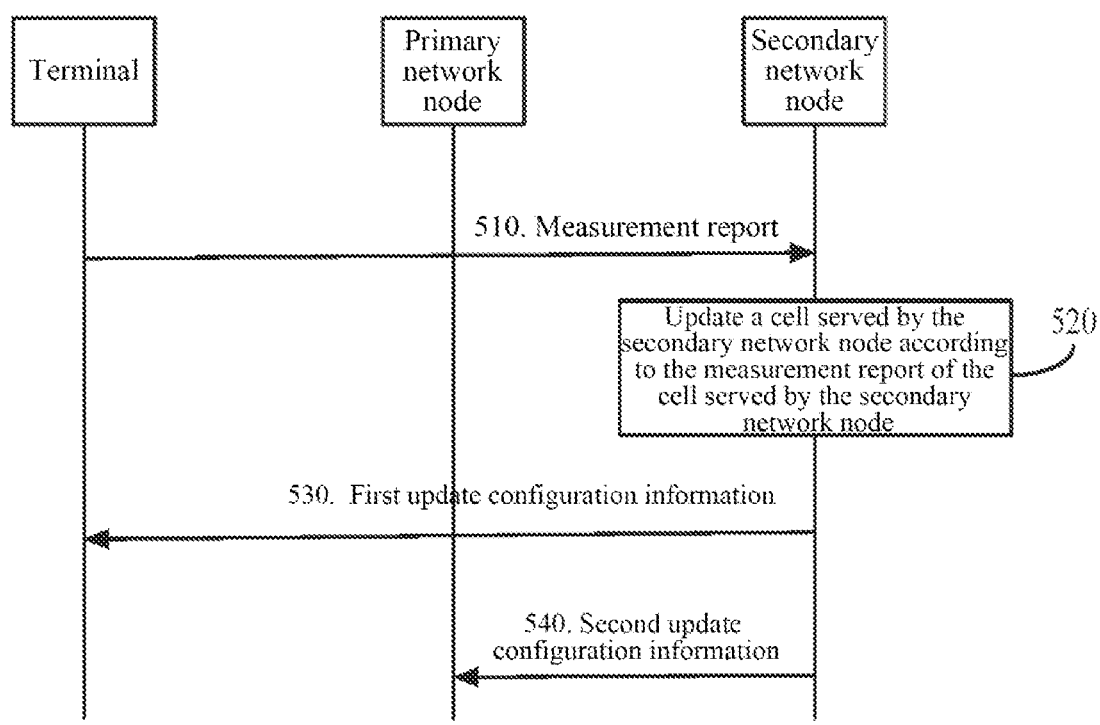
FIG. 5 is a schematic flow chart of a communication method according to another implementation of the present disclosure.

FIG. 5 is a schematic flow chart of a communication method according to an implementation of the present disclosure. A communication method for updating a cell served by a secondary network node according to the implementation of the present disclosure is specifically introduced in FIG. 5. It should be understood that the method shown in FIG. 5 is only described by taking updating the cell served by the secondary network node as an example, and the implementation of the present disclosure is not limited to this. The method shown in FIG. 5 includes acts 510-540.

In 510, a terminal sends a measurement report of a cell served by a secondary network node to the secondary network node.

In 520, the secondary network node updates the cell served by the secondary network node according to the measurement report of the cell served by the secondary network node.

Specifically, updating the cell served by the secondary network node may include adding and/or deleting a cell served by the secondary network node; or updating the cell served by the secondary network node may include switching a primary cell in the cells served by the secondary network node, i.e., switching the primary cell currently serving the terminal to another cell served by the secondary network node.

In 530, the secondary network node sends first update configuration information to the terminal, wherein the first update configuration information is used for updating the cell served by the secondary network node for the terminal.

In 540, the secondary network node sends second update configuration information to a primary network node, wherein the second update configuration information is used for updating the cell served by the secondary network node.

It should be understood that if transmission resources of the primary network node and transmission resources of the secondary network node are allocated to the terminal through the primary network node in a dual-connection communication architecture, the act 540 needs to be performed; if the transmission resources of the primary network node and the transmission resources of the secondary network node may be allocated to the terminal through a core network node (e.g., an EPC or a NextGen Core) in the dual-connection communication architecture, the act 540 may not be performed.

It should be noted that the act 540 may be performed simultaneously with the act 530, or may be performed before the act 530, which is not specifically limited in the implementation of the present disclosure.

Figure 6:
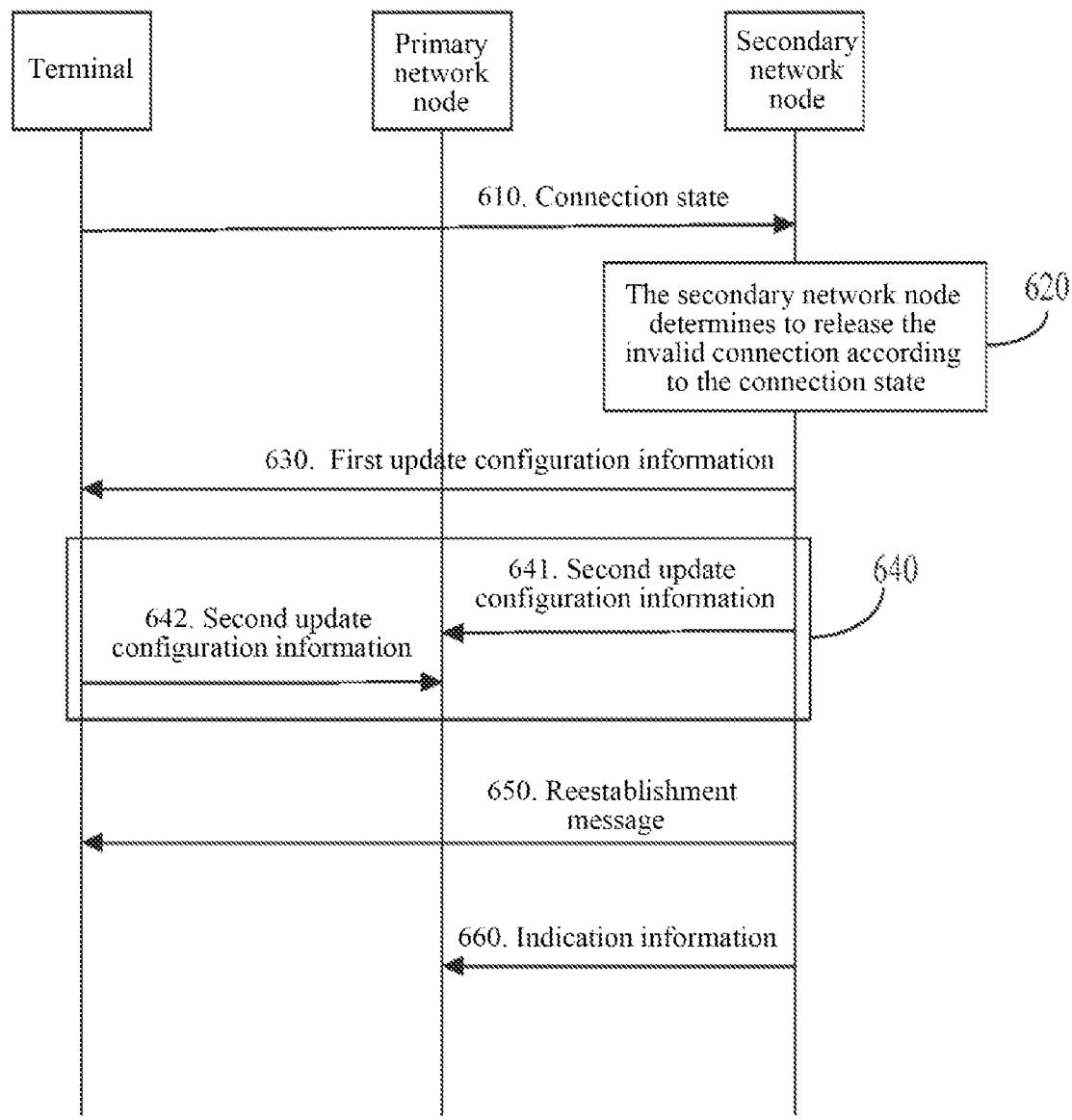
FIG. 6 is a schematic flow chart of a communication method according to another implementation of the present disclosure.

FIG. 6 is a schematic flow chart of a communication method according to an implementation of the present disclosure. A communication method for updating a connection between a cell served by a secondary network node and a terminal according to an implementation of the present disclosure is specifically introduced in FIG. 6. It should be understood that the method shown in FIG. 6 is only described by taking the connection between the cell served by the secondary network node and the terminal as an example, and the implementation of the present disclosure is not limited to this. The method shown in FIG. 6 includes acts 610-660.

In 610, a terminal sends a connection state of a connection between the terminal and a secondary network node to the secondary network node, wherein the connection state is used for indicating that the connection is invalid.

In 620, the secondary network node determines to release the invalid connection according to the connection state.

In 630, the secondary network node sends first update configuration information to the terminal, and the first update configuration information is used for instructing the terminal to release the invalid connection.

In 640, a primary network node receives second update configuration information, which is used for indicating release of the invalid connection.

Specifically, the act 640 may further include following two specific implementation manners 641 and 642.

In 641, the secondary network node sends the second update configuration information to the primary network node.

In 642, the terminal sends the second update configuration information to the primary network node.

Specifically, after receiving the first update configuration information sent by the secondary network node, the terminal may send the second update configuration information to the primary network node.

Optionally, the terminal may carry a reason for the invalid connection between the secondary network node and the terminal in the second update configuration information.

It should be understood that if transmission resources of the primary network node and transmission resources of the secondary network node are allocated to the terminal through the primary network node in a dual-connection communication architecture, the act 640 needs to be performed; if the transmission resources of the primary network node and the transmission resources of the secondary network node may be allocated to the terminal through a core network node (e.g., an EPC or a NextGen Core) in the dual-connection communication architecture, the act 640 may not be performed.

Optionally, in order to share a burden of the primary network node to transmit data for the terminal, when the connection between the terminal and the secondary network node is invalid, the method shown in FIG. 6 may further include acts 650-660.

In 650, the secondary network node sends a reestablishment message to the terminal, wherein the reestablishment message is used for reestablishing the connection between the secondary network node and the terminal.

It should be noted that the secondary network node may determine whether to reestablish the connection between the secondary network node and the terminal through a predetermined rule, or the secondary network node may determine whether to reestablish the connection between the secondary network node and the terminal through a feedback from another network element (e.g., a primary network node, a terminal, or an EPC).

In 660, the secondary network node sends indication information to the primary network node, and the indication information is used for indicating that the connection between the secondary network node and the terminal is reestablished.

Optionally, the indication information may carry a reason for reestablishing the connection between the secondary network node and the terminal.

It should be understood that if transmission resources of the primary network node and transmission resources of the secondary network node are allocated to the terminal through the primary network node in a dual-connection communication architecture, the act 660 needs to be performed; if the transmission resources of the primary network node and the transmission resources of the secondary network node may be allocated to the terminal through a core network node (e.g., an EPC or a NextGen Core) in the dual-connection communication architecture, the act 660 may not be performed.

Figure 7:
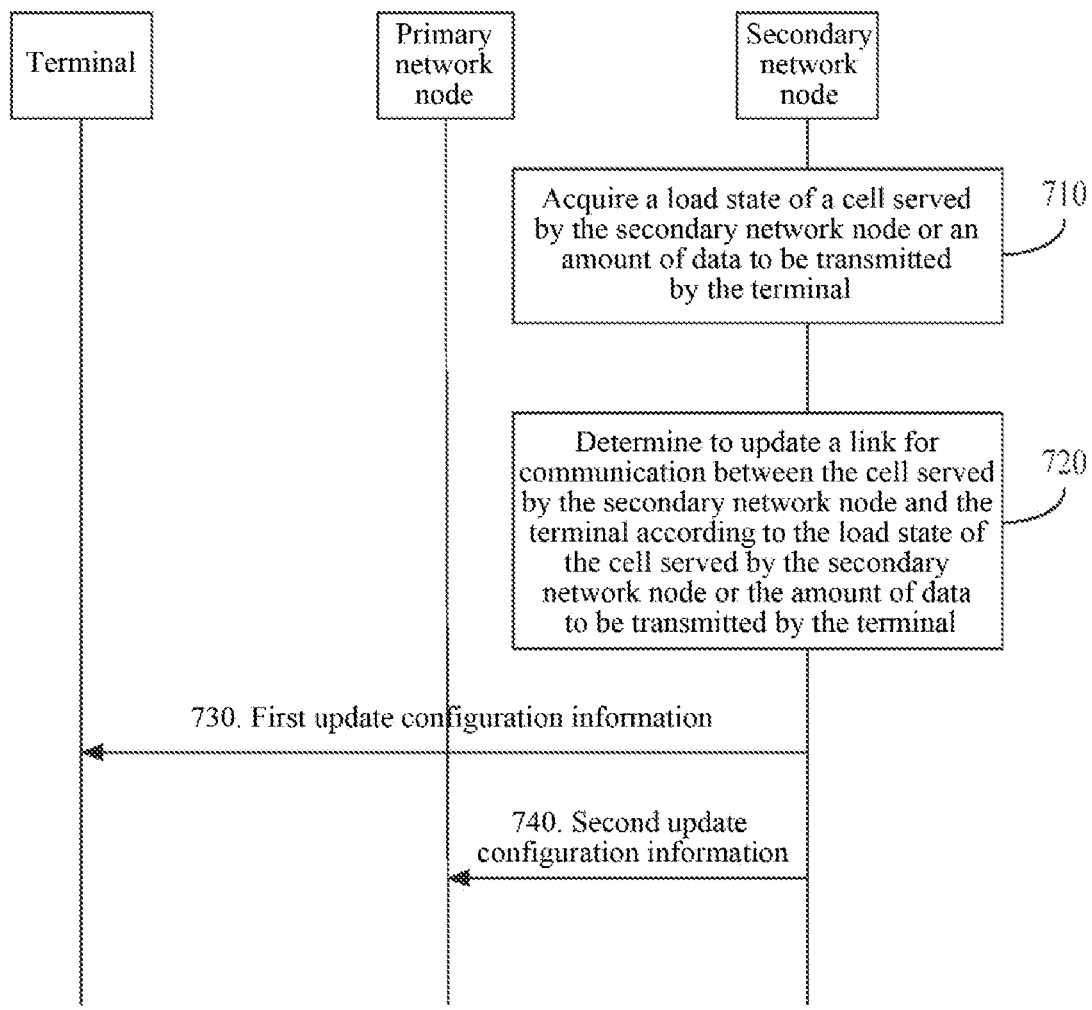
FIG. 7 is a schematic flow chart of a communication method according to another implementation of the present disclosure.

FIG. 7 is a schematic flow chart of a communication method according to another implementation of the present disclosure. A communication method for updating a connection for communication between a cell served by a secondary network node and a terminal according to an implementation of the present disclosure is specifically introduced in FIG. 7. It should be understood that the method shown in FIG. 7 is only described by taking the connection for communication between the cell served by the secondary network node and the terminal as an example, and the implementation of the present disclosure is not limited to this. The method shown in FIG. 7 includes acts 710-740.

In 710, a secondary network node acquires a load state of a cell served by the secondary network node or an amount of data to be transmitted by a terminal.

In 720, the secondary network node determines to update a link for communication between the cell served by the secondary network node and the terminal according to the load state of the cell served by the secondary network node or the amount of data to be transmitted by the terminal.

Specifically, the updating the link for communication between the cell served by the secondary network node and the terminal may include adding and/or deleting a link for communication between the cell served by the secondary network node and the terminal.

In 730, the secondary network node sends first update configuration information to the terminal, wherein the first update configuration information is used for updating the link for communication between the cell served by the secondary network node and the terminal for the terminal.

In 740, the secondary network node sends second update configuration information to a primary network node, wherein the second update configuration information is used for updating the link for communication between the cell served by the secondary network node and the terminal.

It should be understood that if transmission resources of the primary network node and transmission resources of the secondary network node are allocated to the terminal through the primary network node in a dual-connection communication architecture, the act 740 needs to be performed; if transmission resources of the primary network node and transmission resources of the secondary network node may be allocated to the terminal through a core network node (e.g., an EPC or a Next Gen Core) in the dual-connection communication architecture, the act 740 may not be performed.

The communication method of the implementation of the present disclosure has been described in detail with reference to FIGS. 1 to 7. The secondary network node and the terminal of the implementation of the present disclosure will be described in detail below with reference to FIGS. 8 to 11. It should be understood that the apparatuses shown in FIGS. 8 to 11 may realize the various acts in FIG. 4, which will not be described in detail here in order to avoid repetition.

Figure 8:
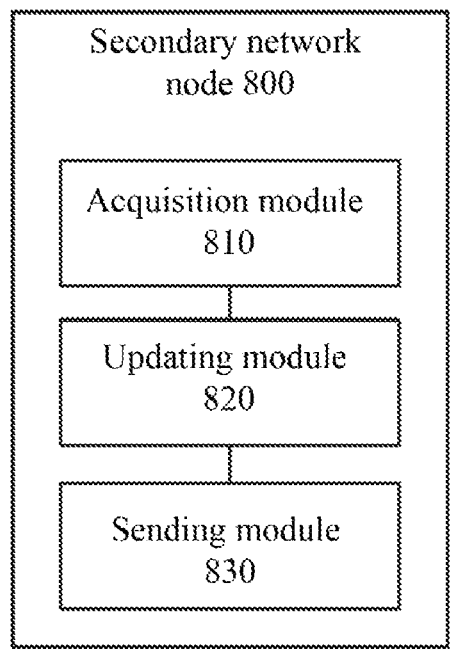
FIG. 8 is a schematic structural diagram of a secondary network node according to an implementation of the present disclosure.

FIG. 8 is a schematic structural diagram of a secondary network node according to an implementation of the present disclosure. The apparatus shown in FIG. 8 includes an acquisition module 810, an updating module 820, and a sending module 830.

The acquisition module is used for acquiring a network state of a cell served by the secondary network node.

The updating module is used for updating a network configuration of the cell served by the secondary network node according to the network state of the cell served by the secondary network node.

The sending module is used for sending first update configuration information to a terminal, wherein the first update configuration information is used for updating the network configuration of the cell served by the secondary network node.

Optionally, as one implementation, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

Optionally, as one implementation, the updating module is specifically used for updating the cell served by the secondary network node according to the network state of the cell served by the secondary network node; the sending module is further specifically used for sending the first update configuration information to the terminal, wherein the first update configuration information is used for updating the cell served by the secondary network node.

Optionally, as one implementation, the acquisition module is specifically used for receiving a measurement report of the cell served by the secondary network node sent by the terminal, wherein the measurement report is used for indicating the network state of the cell served by the secondary network node.

Optionally, as one implementation, the network state of the cell served by the secondary network node includes a link state of a link for communication between the cell served by the secondary network node and the terminal, and the updating module is specifically used for updating the link for communication between the cell served by the secondary network node and the terminal according to the link state; the sending module is specifically used for sending the first update configuration information to the terminal, wherein the first update configuration information is used for updating the link.

Optionally, as one implementation, the link state includes signal quality of a signal transmitted between the cell served by the secondary network node and the terminal, and the updating module is specifically used for updating the link for transmitting the signal according to the signal quality of the signal transmitted between the cell served by the secondary network node and the terminal.

Optionally, as one implementation, the network state of the cell served by the secondary network node includes a connection state of a connection between the secondary network node and the terminal, and the updating module is specifically used for the secondary network node to update the network configuration of the cell served by the secondary network node according to the connection state of the connection between the secondary network node and the terminal.

Optionally, as one implementation, the connection state of the connection between the secondary network node and the terminal is used for indicating that the connection is invalid, and the updating module is specifically used for: releasing the connection between the secondary network node and the terminal according to the connection state of the connection between the secondary network node and the terminal; the sending module is specifically used for sending the first update configuration information to the terminal, wherein the first update configuration information is used for releasing the connection between the secondary network node and the terminal.

Optionally, as one implementation, the acquisition module is specifically used for receiving the connection state of the connection between the cell served by the secondary network node and the terminal, sent by the terminal.

Optionally, as an implementation, the sending module is further specifically used for sending data to be transmitted to a primary network node, wherein the data to be transmitted is data that the terminal prepares to transmit through the secondary network node.

Optionally, as one implementation, the sending module is further used for sending a reestablishment message to the terminal, wherein the reestablishment message is used for reestablishing the connection between the secondary network node and the terminal.

Optionally, as one implementation, the sending module is further used for sending indication information to the primary network node, wherein the indication information is used for indicating that the connection between the secondary network node and the terminal is reestablished between the secondary network node and the terminal.

Optionally, as one implementation, the indication information carries a reason for reestablishing the connection between the secondary network node and the terminal.

Optionally, as one implementation, the network state of the cell served by the secondary network node includes a state of a bearer in the cell served by the secondary network node, and the acquisition module is specifically used for acquiring the state of the bearer in the cell served by the secondary network node; the updating module is specifically used for updating the bearer in the cell served by the secondary network node according to the state of the bearer; the sending module is specifically used for sending the first update configuration information to the terminal, wherein the first update configuration information is used for updating the bearer in the cell served by the secondary network node.

Optionally, as one implementation, a primary cell served by the secondary network node is a first cell, and the acquisition module is specifically used for: acquiring a network state of the first cell. The updating module is specifically used for switching the primary cell from the first cell to a second cell according to the network state of the first cell, wherein the second cell is a cell other than the first cell among cells served by the secondary network node. The sending module is specifically used for sending the first update configuration information to the terminal, wherein the first update configuration information is used for switching the primary cell from the first cell to the second cell.

Optionally, as one implementation, the sending module is further used for sending second update configuration information to the primary network node, wherein the second update configuration information is used for indicating updated network configuration of the secondary network node.

Figure 9:
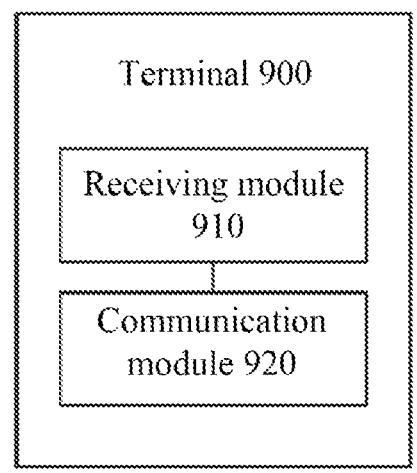
FIG. 9 is a schematic structural diagram of a terminal according to an implementation of the present disclosure.

FIG. 9 is a schematic structural diagram of a terminal according to an implementation of the present disclosure. The apparatus shown in FIG. 9 includes a receiving module 910 and a communication module 920.

The receiving module is used for receiving first update configuration information sent by a secondary network node, wherein the first update configuration information is used for updating a network configuration of a cell served by the secondary network node, and the network configuration of the cell served by the secondary network node is updated by the secondary network node according to a network state of the cell served by the secondary network node.

The communication module is used for communicating with the secondary network node according to the first update configuration information.

Optionally, as one implementation, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

Optionally, as one implementation, the receiving module is specifically used for receiving the first update configuration information sent by the secondary network node, wherein the first update configuration information is used for updating the cell served by the secondary network node. The communication module is specifically used for determining an updated cell served by the secondary network node according to the first update configuration information; and communicating with the secondary network node through the updated cell served by the secondary network node.

Optionally, as one implementation, the terminal further includes: a first sending module, used for sending a measurement report of the cell served by the secondary network node to the secondary network node, wherein the measurement report is used for indicating the network state of the cell served by the secondary network node.

Optionally, as one implementation, the network state of the cell served by the secondary network node includes a link state of a link for communication between the cell served by the secondary network node and the terminal, and the receiving module is specifically used for receiving the first update configuration information sent by the secondary network node, wherein the first update configuration information is used for updating the link; the communication module is specifically used for determining an updated link according to the first update configuration information, and communicating with the secondary network node through the updated link.

Optionally, as one implementation, the link state includes signal quality of a signal transmitted between the cell served by the secondary network node and the terminal.

Optionally, as one implementation, the network state of the cell served by the secondary network node includes a connection state of a connection between the secondary network node and the terminal, wherein the connection state is used for indicating that the connection is invalid, and the receiving module is specifically used for receiving the first update configuration information sent by the secondary network node, wherein the first update configuration information is used for releasing the connection between the secondary network node and the terminal.

Optionally, as one implementation, the terminal further includes: a second sending module, used for sending the connection state of the connection between the cell served by the secondary network node and the terminal, to the secondary network node.

Optionally, as one implementation, the receiving module is further used for receiving a reestablishment message sent by the secondary network node, wherein the reestablishment message is used for reestablishing the connection between the secondary network node and the terminal.

Optionally, as one implementation, the network state of the cell served by the secondary network node includes a state of a bearer in the cell served by the secondary network node, and the receiving module is specifically used for receiving the first update configuration information sent by the secondary network node, wherein the first update configuration information is used for updating the bearer in the cell served by the secondary network node; the communication module is specifically used for determining an updated bearer according to the first update configuration information, and communicating with the secondary network node through the updated bearer.

Optionally, as one implementation, a primary cell served by the secondary network node is a first cell, and the receiving module is specifically used for receiving the first update configuration information sent by the secondary network node, wherein the first update configuration information is used for switching the primary cell from the first cell to the second cell, wherein the second cell is a cell other than the first cell among cells served by the secondary network node. The communication module is specifically used for communicating with the secondary network node through the second cell indicated by the first update configuration information.

Optionally, as one implementation, the terminal further includes: a third sending module, used for sending second update configuration information to the primary network node, wherein the second update configuration information is used for indicating updated network configuration of the secondary network node.

Figure 10:
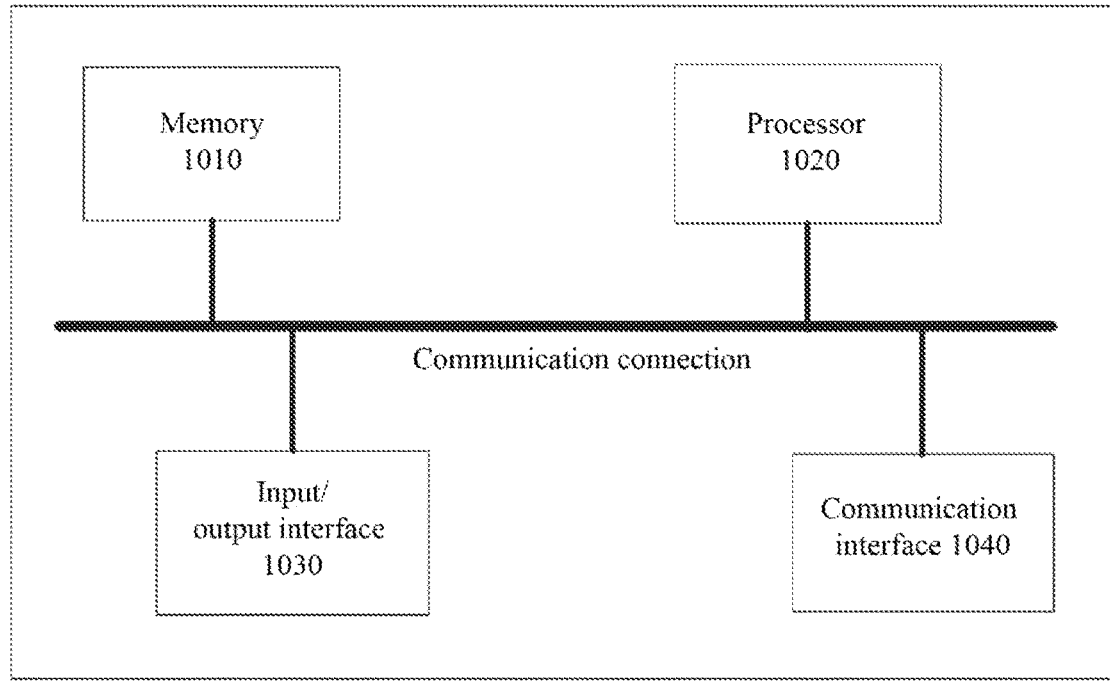
FIG. 10 is a schematic structural diagram of a secondary network node according to another implementation of the present disclosure.

FIG. 10 is a schematic structural diagram of a secondary network node according to another implementation of the present disclosure. The secondary network node 1000 shown in FIG. 10 includes a memory 1010, a processor 1020, an input/output interface 1030, and a communication interface 1040. The memory 1010, the processor 1020, the input/output interface 1030 and the communication interface 1040 are connected through internal connection paths. The memory 1010 is used for storing instructions. The processor 1020 is used for executing the instructions stored in the memory 1020 to control the input/output interface 1030 to receive input data and information, output data such as operation results, and control the communication interface 1040 to send signals.

The processor is used for acquiring a network state of a cell served by the secondary network node; and is further used for updating a network configuration of the cell served by the secondary network node according to the network state of the cell served by the secondary network node.

The communication interface is used for sending first update configuration information to a terminal, wherein the first update configuration information is used for updating the network configuration of the cell served by the secondary network node.

It should be understood that in the implementations of the present disclosure, the processor 1020 may adopt a general-purpose Central Processing Unit (CPU), a microprocessor, an Application Specific Integrated Circuit (ASIC), or one or more integrated circuits for executing related programs, to implement the technical solutions provided by the implementations of the present disclosure.

It should further be understood that the communication interface 1040 uses a transceiving apparatus such as, but not limited to, a transceiver to realize communication between a D2D device 1000 and other devices or communication networks.

The memory 1010 may include a read only memory and a random access memory and provide instructions and data to the processor 1020. A part of the processor 1020 may include a non-volatile random access memory. For example, the processor 1020 may store information about device types.

Optionally, as one implementation, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

Optionally, as one implementation, the processor is specifically used for updating the cell served by the secondary network node according to the network state of the cell served by the secondary network node. The communication interface is further specifically used for sending the first update configuration information to the terminal, wherein the first update configuration information is used for updating the cell served by the secondary network node.

Optionally, as one implementation, the processor is specifically used for receiving a measurement report of the cell served by the secondary network node sent by the terminal, wherein the measurement report is used for indicating the network state of the cell served by the secondary network node.

Optionally, as one implementation, the network state of the cell served by the secondary network node includes a link state of a link for communication between the cell served by the secondary network node and the terminal, and the processor is specifically used for updating the link for communication between the cell served by the secondary network node and the terminal according to the link state; the communication interface is specifically used for sending the first update configuration information to the terminal, wherein the first update configuration information is used for updating the link.

Optionally, as one implementation, the link state includes signal quality of a signal transmitted between the cell served by the secondary network node and the terminal, and the processor is specifically used for updating the link for transmitting the signal according to the signal quality of the signal transmitted between the cell served by the secondary network node and the terminal.

Optionally, as one implementation, the network state of the cell served by the secondary network node includes a connection state of a connection between the secondary network node and the terminal, and the processor is specifically used for updating the network configuration of the cell served by the secondary network node according to the connection state of the connection between the secondary network node and the terminal.

Optionally, as one implementation, the connection state of the connection between the secondary network node and the terminal is used for indicating that the connection is invalid, and the processor is specifically used for: releasing the connection between the secondary network node and the terminal according to the connection state of the connection between the secondary network node and the terminal. The communication interface is specifically used for sending the first update configuration information to the terminal, wherein the first update configuration information is used for releasing the connection between the secondary network node and the terminal.

Optionally, as one implementation, the processor is specifically used for receiving the connection state of the connection between the cell served by the secondary network node and the terminal, sent by the terminal.

Optionally, as an implementation, the communication interface is further specifically used for sending data to be transmitted to a primary network node, wherein the data to be transmitted is data that the terminal prepares to transmit through the secondary network node.

Optionally, as one implementation, the communication interface is further used for sending a reestablishment message to the terminal, wherein the reestablishment message is used for reestablishing the connection between the secondary network node and the terminal.

Optionally, as one implementation, the communication interface is further used for sending indication information to the primary network node, wherein the indication information is used for indicating that the connection between the secondary network node and the terminal is reestablished between the secondary network node and the terminal.

Optionally, as one implementation, the indication information carries a reason for reestablishing the connection between the secondary network node and the terminal.

Optionally, as one implementation, the network state of the cell served by the secondary network node includes a state of a bearer in the cell served by the secondary network node, and the processor is specifically used for: acquiring the state of the bearer in the cell served by the secondary network node. The processor is specifically used for updating the bearer in the cell served by the secondary network node according to the state of the bearer. The communication interface is specifically used for sending the first update configuration information to the terminal, wherein the first update configuration information is used for updating the bearer in the cell served by the secondary network node.

Optionally, as one implementation, a primary cell served by the secondary network node is a first cell, and the processor is specifically used to: acquire a network state of the first cell. The processor is specifically used for switching the primary cell from the first cell to a second cell according to the network state of the first cell, wherein the second cell is a cell other than the first cell among cells served by the secondary network node. The communication interface is specifically used for sending the first update configuration information to the terminal, wherein the first update configuration information is used for switching the primary cell from the first cell to the second cell.

Optionally, as one implementation, the communication interface is further used for sending second update configuration information to the primary network node, wherein the second update configuration information is used for indicating updated network configuration of the secondary network node.

Figure 11:
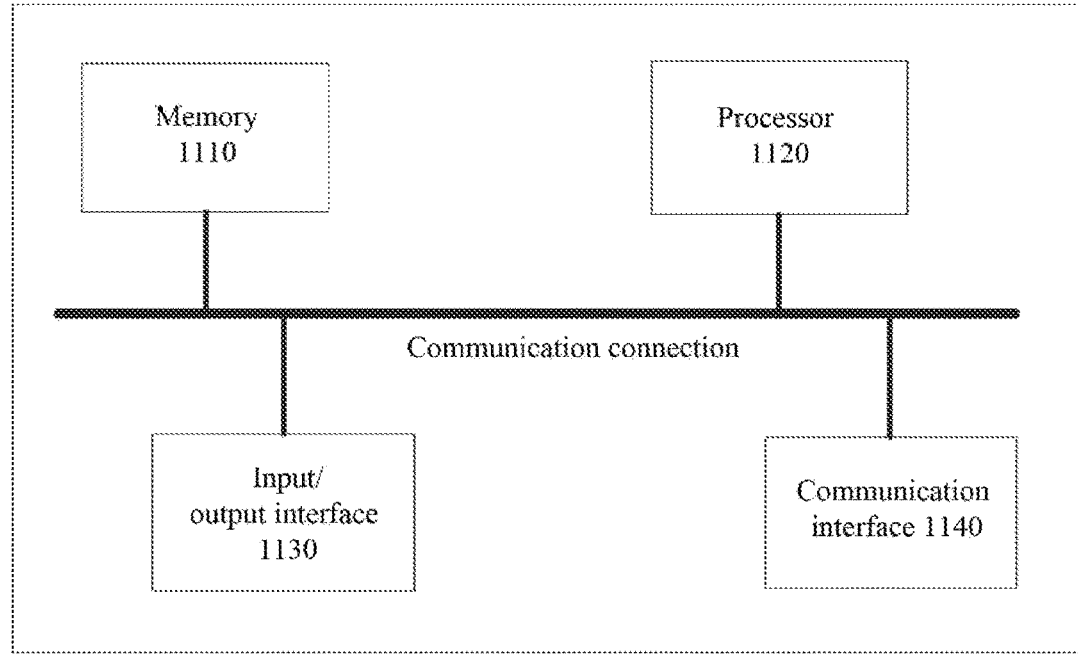
FIG. 11 is a schematic block diagram of a terminal according to another implementation of the present disclosure.

FIG. 11 is a block diagram of a terminal according to another implementation of the present disclosure. The terminal 1100 shown in FIG. 11 includes a memory 1110, a processor 1120, an input/output interface 1130, and a communication interface 1140. The memory 1110, the processor 1120, the input/output interface 1130 and the communication interface 1140 are connected through internal connection paths. The memory 1110 is used for storing instructions. The processor 1120 is used for executing the instructions stored in the memory 1120 to control the input/output interface 1130 to receive input data and information, output data such as operation results, and control the communication interface 1140 to send signals.

The communication interface is used for receiving first update configuration information sent by a secondary network node, wherein the first update configuration information is used for updating a network configuration of a cell served by the secondary network node, and the network configuration of the cell served by the secondary network node is updated by the secondary network node according to a network state of the cell served by the secondary network node; and is further used for communicating with the secondary network node according to the first update configuration information.

It should be understood that in the implementations of the present disclosure, the processor 1120 may adopt a general-purpose Central Processing Unit (CPU), a microprocessor, an Application Specific Integrated Circuit (ASIC), or one or more integrated circuits for executing related programs, to implement the technical solutions provided by implementations of the present disclosure.

It should further be understood that the communication interface 1140 uses a transceiving apparatus such as, but not limited to, a transceiver to realize communication between a D2D device 1100 and other devices or communication networks.

The memory 1110 may include a read only memory and a random access memory and provide instructions and data to the processor 1120. A part of the processor 1120 may include a non-volatile random access memory. For example, the processor 1120 may store information about device types.

Optionally, as one implementation, the network state of the cell served by the secondary network node includes at least one piece of the following information: a congestion state of the cell served by the secondary network node; an amount of data to be transmitted that the terminal prepares to transmit through the secondary network node; a state of a bearer used for transmitting the data to be transmitted by the terminal in the cell served by the secondary network node; signal quality of a signal transmitted between the cell served by the secondary network node and the terminal; a connection state of a connection between the secondary network node and the terminal; and a link state of a link for communication between the secondary network node and the terminal.

Optionally, as one implementation, the communication interface is specifically used for receiving the first update configuration information sent by the secondary network node, wherein the first update configuration information is used for updating the cell served by the secondary network node. The communication module is specifically used for determining an updated cell served by the secondary network node according to the first update configuration information; and communicating with the secondary network node through the updated cell served by the secondary network node.

Optionally, as one implementation, the communication interface is further used for sending a measurement report of the cell served by the secondary network node to the secondary network node, wherein the measurement report is used for indicating the network state of the cell served by the secondary network node.

Optionally, as one implementation, the network state of the cell served by the secondary network node includes a link state of a link for communication between the cell served by the secondary network node and the terminal, and the communication interface is specifically used for receiving the first update configuration information sent by the secondary network node, wherein the first update configuration information is used for updating the link. The communication module is specifically used for determining an updated link according to the first update configuration information, and communicating with the secondary network node through the updated link.

Optionally, as one implementation, the link state includes a signal quality of a signal transmitted between the cell served by the secondary network node and the terminal.

Optionally, as one implementation, the network state of the cell served by the secondary network node includes a connection state of a connection between the secondary network node and the terminal, wherein the connection state is used for indicating that the connection is invalid, and the communication interface is specifically used for receiving the first update configuration information sent by the secondary network node, wherein the first update configuration information is used for releasing the connection between the secondary network node and the terminal.

Optionally, as one implementation, the communication interface is further used for sending the connection state of the connection between the cell served by the secondary network node and the terminal to the secondary network node.

Optionally, as one implementation, the communication interface is further used for receiving a reestablishment message sent by the secondary network node, wherein the reestablishment message is used for reestablishing the connection between the secondary network node and the terminal.

Optionally, as one implementation, the network state of the cell served by the secondary network node includes a state of a bearer in the cell served by the secondary network node, and the communication interface is specifically used for receiving the first update configuration information sent by the secondary network node, wherein the first update configuration information is used for updating the bearer in the cell served by the secondary network node. The communication module is specifically used for determining an updated bearer according to the first update configuration information, and communicating with the secondary network node through the updated bearer.

Optionally, as one implementation, a primary cell served by the secondary network node is a first cell, and the communication interface is specifically used for receiving the first update configuration information sent by the secondary network node, wherein the first update configuration information is used for switching the primary cell from the first cell to a second cell, wherein the second cell is a cell other than the first cell among cells served by the secondary network node. The communication module is specifically used for communicating with the secondary network node through the second cell indicated by the first update configuration information.

Optionally, as one implementation, the communication interface is further used for sending second update configuration information to a primary network node, wherein the second update configuration information is used for indicating updated network configuration of the secondary network node.

It should be understood that in the implementations of the present disclosure, "B corresponding to A" means that B is associated with A, and B may be determined according to A. However, it should be further understood that determining B according to A does not mean B is determined according to A only, but B may be determined according to A and/or other information.

The term "and/or" in this document is merely an association relationship describing associated objects, indicating that there may be three relationships, for example, A and/or B may indicate three situations: A alone, A and B, and B alone. In addition, the character "/" in this document generally indicates that the objects before and after the character have an "or" relationship.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The implementations may be implemented in whole or in part by software, hardware, firmware, or any combination thereof. When implemented by software, the implementations may be implemented in whole or in part in a form of a computer program product. The computer program product includes one or more computer instructions. When the computer program instructions are loaded and executed on a computer, the flows or functions described in accordance with implementations of the present disclosure are generated in whole or in part. The computer may be a general purpose computer, a special purpose computer, a computer network, or other programmable apparatus. The computer instructions may be stored in a computer readable storage medium or transferred from one computer readable storage medium to another computer readable storage medium. For example, the computer instructions may be transferred from a website site, computer, server or data center to another website site, computer, server, or data center by wire (e.g., coaxial cable, fiber optic, digital subscriber line (DSL)) or wirelessly (e.g., infrared, wireless, microwave, etc.). The computer readable storage medium may be any available medium that may be read by a computer, or a data storage device including a server, or a data center, etc. that integrated by one or more available medium. The available medium may be a magnetic medium (e.g., a floppy disk, a hard disk, a magnetic tape), an optical medium (e.g., a DVD), or a semiconductor medium such as a solid state disk (SSD) or the like.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be the protection scope defined by the claims.

What is claimed is:

1. A communication method, comprising:
   receiving, by a secondary network node, measurement report from a terminal device; and
   sending, by the secondary network node, first information to the terminal device, wherein the first information is used for updating configuration of a cell served by the secondary network node,
   wherein the first information comprises IDs of all updated cells served by the secondary network node or an ID of an added cell or released cell served by the secondary network node, and
   wherein the measurement report comprises signal quality of a signal transmitted between the cell served by the secondary network node and the terminal device, and the signal quality of a signal transmitted between the cell served by the secondary network node and the terminal device comprises Reference Signal Receiving Power (RSRP) or reference signal receiving quality (RSRQ).

2. The method of claim 1, wherein the first information is directly sent by the secondary network node to the terminal device without involving signaling interaction with a primary network node.

3. The method of claim 1, wherein the updating the configuration of the cell served by the secondary network node comprises:
   adding or releasing a cell served by the secondary network node.

4. The method of claim 1, wherein the ID comprises: an index of the added cell or released cell served by the secondary node.

5. The method of claim 1, wherein the method further comprises:
   sending, by the secondary network node, second information to the primary network node, wherein the second information is used to notify the updated configuration of the cell served by the secondary network node.

6. The method of claim 1, wherein communication between the cell served by the secondary network node and the terminal device is by using a radio resource control (RRC) connection.

7. A communication method, comprising:
   receiving, by a terminal device, first information sent by a secondary network node, wherein the first information is used for updating a configuration of a cell served by the secondary network node; and
   communicating, by the terminal device, with the secondary network node according to the first information,
   wherein the first information comprises IDs of all updated cells served by the secondary network node or an ID of an added cell or released cell served by the secondary network node, and
   wherein the measurement report comprises signal quality of a signal transmitted between the cell served by the secondary network node and the terminal device, and the signal quality of a signal transmitted between the cell served by the secondary network node and the terminal device comprises Reference Signal Receiving Power (RSRP) or reference signal receiving quality (RSRQ).

8. The method of claim 7, wherein the updating the configuration of the cell served by the secondary network node comprises:
adding or releasing a cell served by the secondary network node.

9. The method of claim 7, wherein the ID comprises: an index of the added cell or released cell served by the secondary network node.

10. The method of claim 7, wherein communication between the cell served by the secondary network node and the terminal device is by using a radio resource control (RRC) connection.

11. A secondary network node, comprising a processor and a communication interface,
wherein the processor is used for receiving a measurement report from a terminal device,
wherein the communication interface is used for sending first information to the terminal device, wherein the first information is used for updating a configuration of a cell served by the secondary network node,
wherein the first information comprises IDs of all updated cells served by the secondary network node or an ID of an added cell or released cell served by the secondary network node, and
wherein the measurement report comprises signal quality of a signal transmitted between the cell served by the secondary network node and the terminal device, and the signal quality of a signal transmitted between the cell served by the secondary network node and the terminal device comprises Reference Signal Receiving Power (RSRP) or reference signal receiving quality (RSRQ).

12. The secondary node of claim 11, wherein the first information is directly sent by the secondary network node to the terminal device without involving signaling interaction with a primary network node.

13. The secondary node of claim 11, wherein the updating the configuration of the cell served by the secondary network node comprises:
adding or releasing a cell served by the secondary network node.

14. The secondary node of claim 11, wherein the ID comprises: an index of the added cell or released cell served by the secondary network node.

* * * * *